(12) United States Patent
Klemt et al.

(10) Patent No.: US 12,398,813 B2
(45) Date of Patent: Aug. 26, 2025

(54) DIAPHRAGM FOR A DIAPHRAGM VALVE, MULTI-PART DIAPHRAGM, DIAPHRAGM VALVE, METHOD FOR INSTALLATION

(71) Applicant: GEMÜ Gebr. Müller Apparatebau Gmbh & Co. Kommanditgesellschaft, Ingelfingen (DE)

(72) Inventors: Michael Klemt, Pfedelbach (DE); Steffen Meinikheim, Ingelfingen (DE)

(73) Assignee: GEMÜ Gebr. Müller Apparatebau GmbH & Co. Kommanditgesellschaft, Ingelfingen (DE)

( * ) Notice: Subject to any disclaimer, the term of this patent is extended or adjusted under 35 U.S.C. 154(b) by 0 days.

(21) Appl. No.: 18/037,823

(22) PCT Filed: Nov. 10, 2021

(86) PCT No.: PCT/EP2021/081173
§ 371 (c)(1),
(2) Date: May 19, 2023

(87) PCT Pub. No.: WO2022/106267
PCT Pub. Date: May 27, 2022

(65) Prior Publication Data
US 2024/0011570 A1    Jan. 11, 2024

(30) Foreign Application Priority Data
Nov. 19, 2020 (DE) .................... 10 2020 130 652.0

(51) Int. Cl.
*F16K 7/12* (2006.01)

(52) U.S. Cl.
CPC ..................... *F16K 7/12* (2013.01)

(58) Field of Classification Search
CPC ... F16K 7/12; F16K 7/126; F16K 7/14; F16K 15/144; F16K 31/365; F16J 3/02
See application file for complete search history.

(56) References Cited

U.S. PATENT DOCUMENTS

| 6,047,953 | A | 4/2000 | Jacob, Jr. |
| 7,926,785 | B2 * | 4/2011 | Wincek .................. F16K 7/126 251/331 |
| 9,109,707 | B2 * | 8/2015 | Goulding ................. F16J 15/10 |

(Continued)

FOREIGN PATENT DOCUMENTS

| DE | 10 2016 101 782 A1 | 8/2017 |
| DE | 10 2017 128 996 A1 | 6/2019 |

(Continued)

OTHER PUBLICATIONS

International Search Report from corresponding PCT Application No. PC/EP2021/081173, dated Mar. 4, 2022.

(Continued)

*Primary Examiner* — Hailey K. Do
(74) *Attorney, Agent, or Firm* — Harness, Dickey & Pierce, P.L.C.

(57) ABSTRACT

The invention relates to a diaphragm for a diaphragm valve having a functional region and a clamping region surrounding the functional region, at least one main body of the diaphragm freeing at least one opening in the clamping region, in which at least one gripping aid comprising a plastics material is provided.

13 Claims, 6 Drawing Sheets

(56) References Cited

U.S. PATENT DOCUMENTS

2006/0162547 A1* 7/2006 Muller .................. F16K 7/12
 92/98 R
2022/0186844 A1 6/2022 Obara et al.

FOREIGN PATENT DOCUMENTS

GB 2367098 A * 3/2002 ............ F02G 1/053
WO WO-2020203553 A1 10/2020

OTHER PUBLICATIONS

Written Opinion from corresponding PCT Application No. PC/EP2021/081173, dated Mar. 4, 2022.
Search Report from corresponding German Patent Application No. 10 2020 130 652.0, dated Oct. 14, 2021.

* cited by examiner

DIAPHRAGM FOR A DIAPHRAGM VALVE, MULTI-PART DIAPHRAGM, DIAPHRAGM VALVE, METHOD FOR INSTALLATION

CROSS-REFERENCE TO RELATED APPLICATIONS

This application is a national phase application of PCT Application No. PCT/EP2021/081173, filed on 10 Nov. 2021, which claims the benefit of and priority to German Patent Application No. 10 2020 130 652.0, filed on 19 Nov. 2020. The entire disclosures of the applications identified in this paragraph are incorporated herein by references.

The following description relates to advances in the field of diaphragm valves.

In valve diaphragms which are made, for example, of elastomers, that are tensioned between the valve body and a corresponding element which supports the valve body, relaxation of the tension occurs. Factors influencing the tension relaxation includes: temperature—which, for example, acts on the valve diaphragm from the process medium; the material selection for the diaphragm; and the applied tensioning force. The functional relationship is therefore complex.

The problems of the prior art are solved by a diaphragm for a diaphragm valve according to claim 1, by a multi-part diaphragm according to an independent claim, by a diaphragm valve according to an independent claim, and by a method for assembly according to an independent claim. Advantageous further developments can be found in the dependent claims, the following description and the figures.

According to a first aspect of the description, a diaphragm for a diaphragm valve is provided. The diaphragm comprises a functional region and a clamping region surrounding the functional region, wherein at least one main body of the diaphragm provides at least one recess as an opening in the clamping region, in which recess at least one tensioning means comprising a plastics material is arranged.

Clamping portions belonging to the diaphragm valve compress the clamping region of the diaphragm during assembly until they butt up against the resistance of the tensioning means. The assembler accordingly receives direct feedback that the clamping position of the two clamping portions appropriate for the diaphragm has been reached. Advantageously, the tensioning means comprising the plastics material thus forms an end stop during assembly, and also when the clamping force is readjusted—for example, when the seal of the valve with respect to the outside decreases and process fluid leaks.

Since the tensioning means is exposed to the same temperatures and clamping forces as the diaphragm in its clamping region, the tensioning means ages together with the rest of the diaphragm. In particular, the clamping force causes the respective materials in the clamping region of the diaphragm and the tensioning means to fatigue. The parallel aging of the diaphragm and the tensioning means results in the advantage that the diaphragm can be re-tightened up to the stop. The resistance built up by the aged tensioning means is achieved at a position of the clamping portions with respect to one another in which there is a smaller distance than the distance during the initial assembly.

Pressure deformation and processes within the main body reduce their deformation resistance in the clamping region during operation of the diaphragm. The aged tensioning means is then available, at a reduced height, to provide a deformation resistance upon re-tightening.

Advantageously, the clamping region of the diaphragm can thus be precisely re-tensioned in order to ensure the seal of the diaphragm valve with respect to the outside. The initial assembly and the re-tensioning is therefore predefined and reproducible. This prevents an excessive strong or weak clamping. Unintended errors during assembly and during the re-tensioning are prevented. This advantageously increases the service life of the diaphragm and reduces maintenance costs.

An advantageous example is characterized in that, in a non-tensioned state of the diaphragm, the size of the clamping region perpendicular to an imaginary diaphragm plane is greater than the tensioning means.

In this way, contact surfaces of the tensioning means are further back relative to the associated surface of the clamping region. The clamping region of the diaphragm which surrounds the tensioning means is thus compressed first during the tensioning process and provides the desired seal with respect to the outside. Due to the increasing clamping force, the clamping portion of the diaphragm is compressed up until the point when the clamping portions meet the increased deformation resistance of the tensioning means. The tensioning means thus serves as an end stop for the tensioning of the clamping region of the diaphragm.

An advantageous example is characterized in that the at least one recess is a through-opening, and wherein contact surfaces of the tensioning means are exposed on both sides of the diaphragm.

The exposed contact surfaces of the tensioning means can thus be contacted directly and are therefore arranged in the force path parallel to the material of the clamping region surrounding the tensioning means.

An advantageous example is characterized in that the material of the tensioning means fills at least 40%, in particular at least 80%, in particular completely, an imaginary cross-section of the recess lying in the imaginary diaphragm plane. If the material of the tensioning means fills the recess completely, for example, the tensioning means provides a closed body made of solid material. If, on the other hand, the cross-section of the recess is partially filled, tensioning pins can be guided through a through-opening of the tensioning means, for example.

In particular in the case of complete filling of the recess, the function of the tensioning means is decoupled from other functions, such as, for example, the passage of stay bolts through the diaphragm. Furthermore, in particular in the case of a higher degree of filling of the recess, the counter-bearing effect of the tensioning means during the assembly or during the re-tightening is improved to the effect that a reduced space requirement is necessary.

An advantageous example is characterized in that the diaphragm comprises a plurality of recesses with the tensioning means arranged therein, wherein at least two of the plurality of tensioning means are arranged on opposite sides of the functional region of the diaphragm.

Advantageously, a certain symmetry of the tensioning forces acting on the diaphragm can thus be built up and maintained. In other words, in particular by means of substantially the same sizing of the plurality of tensioning means with respect to the diaphragm thickness, no clamping force differences are produced around the functional region which could lead to a leakage.

An advantageous example is characterized in that the plastics material of the tensioning means has a preferred direction, in particular in a pre-assembly state, which extends perpendicular to an imaginary diaphragm plane.

In plastics, the preferred direction can be changed particularly when the plastics material is heated and transitions into a deformable state. The process temperatures in diaphragm valves can be, for example, in a range of −20° C. to 140° C. When the temperature is increased, the alignment of individual molecular chains changes under the acting clamping pressure. The longer the tensioning means is exposed to an elevated temperature under pressure, the more molecules change their orientation, and the tensioning means ages together with the main body of the diaphragm. The preferred direction can be provided, for example, by an extruded plastic profile that is cut to length to produce the tensioning means.

An advantageous example is characterized in that the at least one tensioning means has a modulus of elasticity, in particular perpendicular to the imaginary diaphragm plane, which is at least five times greater, in particular at least ten times greater, in particular at least one hundred times greater than a modulus of elasticity of the main body in the clamping region, in particular perpendicular to the imaginary diaphragm plane.

The greater the difference between the two moduli of elasticity, the stronger the stop that is perceptible by the assembler and caused by the tensioning means.

An advantageous example is characterized in that a material of the main body comprises an elastomer, in particular a synthetic rubber such as, for example, ethylene propylene diene rubber, and wherein the plastics material of the tensioning means comprises a thermoplastic material, in particular a polypropylene.

This example of a material combination is a matching of materials in particular with regard to their temperature behavior under the permanent action of a clamping force, in such a way that both materials or substances are age together in such a way that a re-tightening of the clamping force with the "shrunk" tensioning means is possible, giving a reliable seal. In particular, softening temperatures of the material of the main body and of the plastics material of the tensioning means are matched to one another such that the desired aging behavior of the tensioning means arises.

A second aspect of the description focuses on a multi-part diaphragm. It comprises a wet-side diaphragm, and the diaphragm according to the first aspect arranged on the dry side.

In one example, the recess assigned to the tensioning means leads through the diaphragm arranged on the wet side and the diaphragm arranged on the dry side.

Advantageously, the tensioning means can thus contact the two associated clamping portions of the diaphragm valve.

In an alternative example, the recess assigned to the tensioning means leads through the diaphragm arranged on the dry side, wherein a contact surface of the tensioning means can be contacted with a dry side of the wet-side diaphragm.

Advantageously, the wet-side diaphragm does not have to be perforated for the purpose of tensioning, and at the same time the stop for the dry-side diaphragm which ages in parallel can be provided.

A third aspect of the description relates to a diaphragm valve comprising the diaphragm according to the first or second aspect, wherein the clamping region of the diaphragm is tensioned between a first clamping portion of a valve body and a second clamping portion which is supported on the valve body.

A fourth aspect focuses on a method for assembling the diaphragm according to the first or second aspect. The method comprises: Arranging, in particular as part of an initial assembly, the diaphragm between a first clamping portion of a valve body and a second clamping portion which is supported on the valve body; tensioning, in particular as part of the initial assembly, the clamping region of the diaphragm between the first and second clamping portions; and re-tensioning, in particular as part of maintenance of the clamping region of the diaphragm between the first and second clamping portions, said maintenance taking place after the initial assembly.

Consequently, due to the tensioning means, the diaphragm does not have to be removed for the re-tensioning. Rather, the diaphragm can remain in operation with the tensioning means, and the maintenance process can even take place during operation of the diaphragm valve in one example.

An advantageous example is characterized in that the clamping region initially provides a first deformation resistance during the clamping and the re-tensioning, and wherein the tensioning means subsequently provides a second deformation resistance during both the tensioning and the re-tensioning which is greater than the associated first deformation resistance.

The second deformation resistance causes a force feedback which, for example, indicates to the assembler that the appropriate clamping force is applied and the clamping force acting on the clamping region of the diaphragm is not to be increased further.

DETAILED DESCRIPTION

Figure 1:
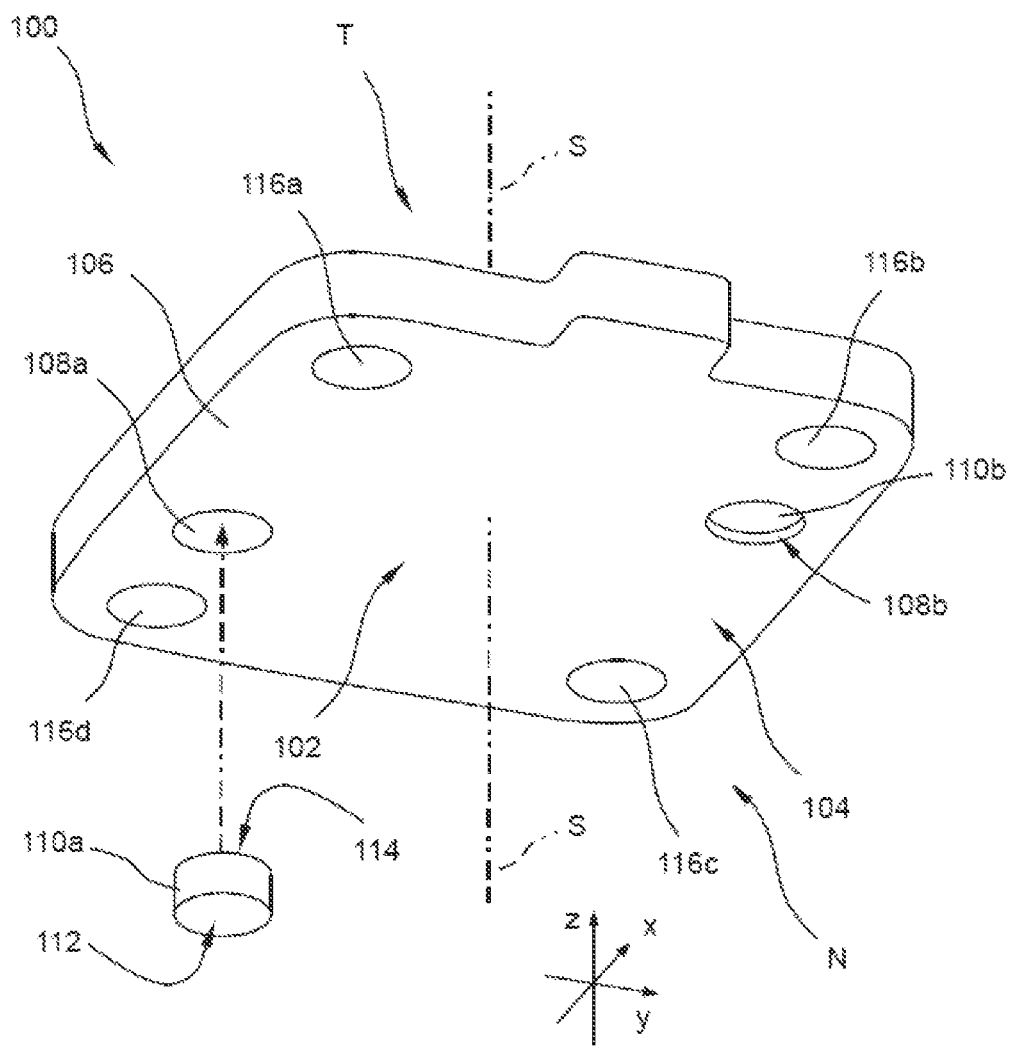
FIGS. 1, 3 and 5 each show a diaphragm for a diaphragm valve in a perspective view.

FIG. 1 shows in schematic perspective form a diaphragm 100 for a diaphragm valve, having a central functional region 102, which is movable along an adjusting axis S which runs perpendicular to an imaginary diaphragm plane xy, for the purpose of opening and closing the diaphragm valve. A clamping region 104 enclosing the functional region 102 is fixable to a valve body. A main body 106 of the diaphragm 100, which provides the functional region 102 and the major part of the clamping region 104, provides at least one recess 108*a*, 108*b* in the clamping region 104. A tensioning means 110*a*, 110*b* comprising a plastics material is arranged in each of the recesses 108*a*, 108*b*.

The single-layer diaphragm 100 shown in the non-loaded state substantially in the imaginary diaphragm plane xy can be used alone or in combination with a further diaphragm in the diaphragm valve. The imaginary diaphragm plane xy runs through the clamping region 104.

In a non-loaded state of the diaphragm 100, the size of the clamping region 104 perpendicular to the imaginary diaphragm plane is greater than the size of the tensioning means 110*a*, 110*b*.

The at least one recess 108*a*, 108*b* is a through-opening which leads through the main body 106 of the diaphragm 100 perpendicular to the diaphragm plane xy. Contact surfaces 112, 114 of the tensioning means 110*a*, 110*b* are exposed on both sides of the diaphragm 100.

Through-openings 116*a*-*d* are used for the passage of stay bolts which connect drive bodies or intermediate bodies to the valve body, and enable tensioning of the clamping region 104 of the diaphragm 100 via the tightening of nuts assigned to the stay bolts. Of course, embodiments are also conceivable which do not have through-openings 116a-d and/or have no stay bolts.

Material of the tensioning means 110 fills an imaginary cross-section of the recess 108a, 108b lying in the imaginary diaphragm plane xy by at least 40%, for example at least 80%, for example completely. The tensioning means 110a is shown in FIG. 1 as a solid cylinder which is inserted along its imaginary cylinder axis into the associated opening 108a according to the arrow shown, and is held, for example, by means of a press fit. The tensioning means 110b is already located in the associated recess 108b.

Of course, the shape of the tensioning means 110a, 110b is only exemplary. The tensioning means 110a, 110b can also assume other shapes. In one example, the tensioning means comprises connecting webs which connect multiple portions of the tensioning means arranged in through-openings per the indicated recesses 108a-b. It is also conceivable that the recess opens towards a narrow side of the diaphragm 100 for the arrangement of the tensioning means.

The diaphragm 100 comprises in particular a plurality of recesses 108a, 108b with the respective tensioning means 110a, 110b arranged therein. The at least two of the plurality of tensioning means 110a, 110b are arranged on opposite sides of the functional region 102 of the diaphragm 100.

The plastics material of the tensioning means 110a, 110b, in particular in a pre-assembly state, has a preferred direction which extends perpendicular to an imaginary diaphragm plane xy. The preferred direction represents an averaged alignment of polymer chains within the plastic. This preferred direction is produced, for example, by extrusion, by drawing the still plastically deformable material in the extrusion direction, whereby the polymer chains align themselves according to the tensile load. As a result of the pre-stretching of the tensioning means associated with the preferred direction, temperature changes result in a resetting of the tensioning means along the force direction, and thus make it possible to re-tighten the entire diaphragm 100.

The at least one tensioning means 110a, 110b is associated with a modulus of elasticity, in particular perpendicular to the imaginary diaphragm plane xy, which is at least five times greater, in particular at least ten times greater, in particular at least one hundred times greater than a further modulus of elasticity. The further modulus of elasticity is associated with the main body 106 in the clamping region 104 and relates to the direction perpendicular to the imaginary diaphragm plane xy.

A material of the main body 106 comprises an elastomer, in particular a synthetic rubber, such as, for example, ethylene propylene diene rubber. The plastics material of the tensioning means 110a, 110b is a thermoplastic material, in particular a polypropylene. In an alternative example, the material of the main body comprises, for example, a fluororubber, and the plastics material of the tensioning means is a thermosetting plastic.

Finally, the function of the diaphragm 100 is explained for FIG. 1, which can of course also be transferred to multi-part diaphragms. The functional region 102 of the diaphragm 100 is pressed against the valve seat of the valve body in order to close off a fluid channel for process fluid formed by the valve body and a wet side N of the diaphragm 100. The movement is caused by a drive rod which is moved by the drive along the adjusting axis S and presses, for example, with a pressure piece onto a dry side T of the functional region 102. By moving the two-component diaphragm 100 away from the valve seat, the fluid channel is opened. The adjusting axis S runs, for example, perpendicular to an imaginary diaphragm plane in the region of an imaginary center of the diaphragm 100. The diaphragm 100 comprises the static central functional region 102, which is pressed onto the valve seat on the wet side for the purpose of closing the diaphragm valve. The diaphragm 100 comprises the clamping region 104 surrounding the central functional region 102, which is tensioned between two components of the diaphragm valve and seals the diaphragm valve with respect to the outside.

Figure 2:
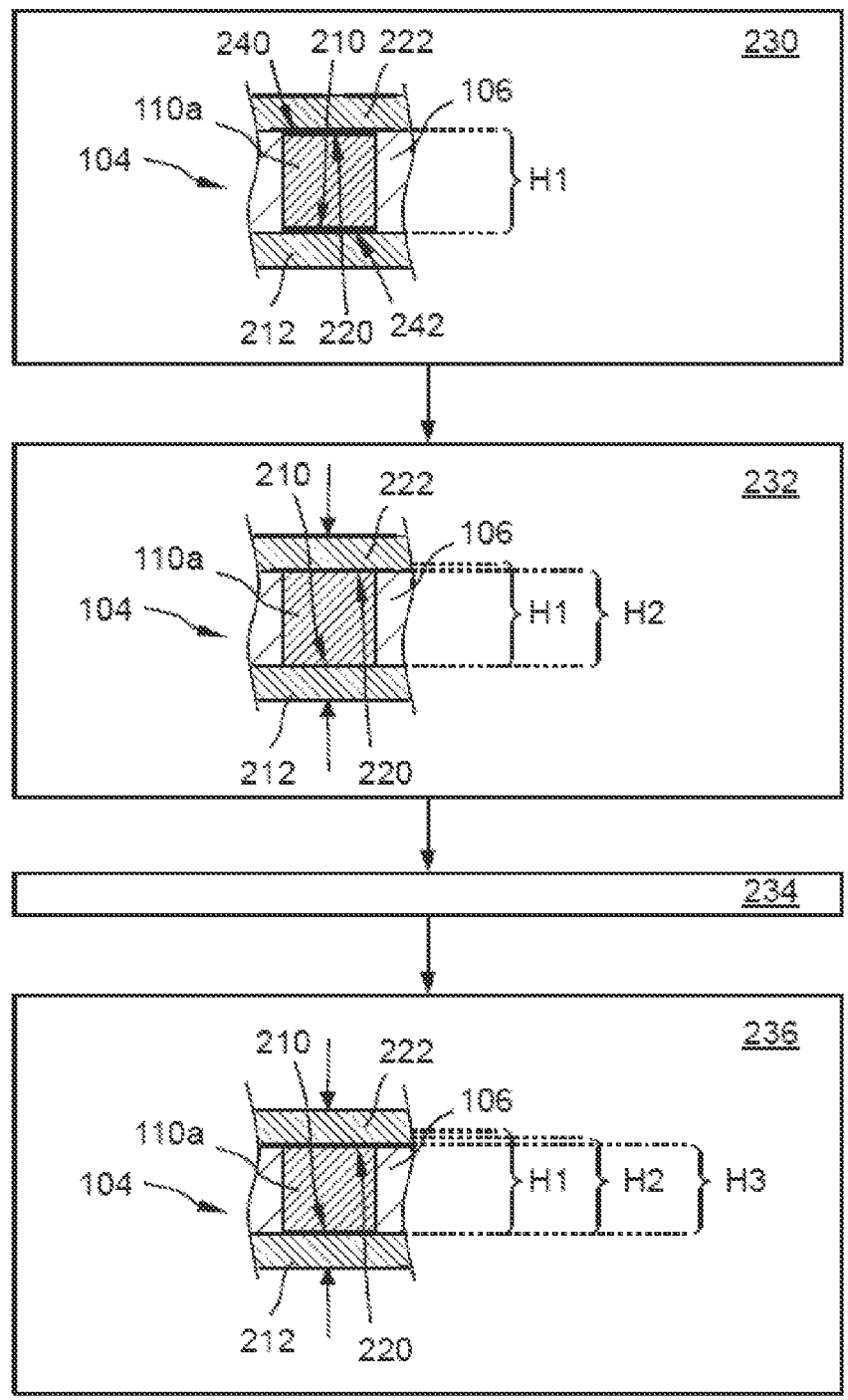
FIG. 2 shows a schematic flow chart.

FIG. 2 shows a schematic flowchart of a sequence for installing and maintaining the diaphragm. Schematic sections of a part of the diaphragm valve represent different states of the clamping of the diaphragm. The clamping region 104 of the diaphragm 100 is tensioned between a first clamping portion 210 of a valve body 212 and a second clamping portion 220, for example a clamping element 222, which is supported on the valve body 212.

The clamping element 222 represents, for example, a drive body, intermediate body or an additional element which, for example, has through-openings corresponding to the through-openings of the diaphragm for the passage of stay bolts. The clamping element 222 is supported on the valve body 212 via the stay bolts. Of course, other embodiments of the diaphragm and of the diaphragm valve which, for example, do not utilize any stay bolts, are also conceivable. The diaphragm can also have a round or different type than the substantially rectangular outline shown.

A step 230 is the arranging, in particular as part of the initial assembly, of the diaphragm 100 between a first clamping portion 210 of a valve body 212 and a second clamping portion 220 which is supported on the valve body 212. During the initial assembly according to step 230, the main body 106 has a thickness H1. The tensioning means 110a is, for example, arranged between the clamping portions 210, 220 such that at least one cavity 240, 242 remains free in the non-tensioned state of the clamping region 104.

Subsequently, in particular as part of the initial assembly, the clamping region 104 of the diaphragm 100 is tensioned between the first and second clamping portions 210, 220 according to a step 232. The desired clamping in step 232, in which the clamping region 104 is compressed starting from the thickness H1 to the thickness H2, is produced. The thickness H2 corresponds substantially to the height of the tensioning means 110a in its delivery state.

In a step 234, the operation of the diaphragm valve takes place over an operating period of several days, weeks, months or years. During this time, the desired aging process of the tensioning means takes place.

A re-tensioning takes place in a step 236, in particular as part of maintenance taking place after the initial assembly. In this case, the clamping region 104 of the diaphragm 100 is re-tensioned between the first and second clamping portions 210, 220, i.e., the pressure on the clamping region 104 is increased.

After the operation of the diaphragm valve has been carried out in step 234, the maintenance is carried out in step 236. During operation of the diaphragm valve, the tensioning means 110a has aged, and has a height or thickness H3 which is less than the thickness H3. This allows a re-tightening; the main body is further compressed, and the tensioning means 110a provides an increased deformation resistance when the thickness H3 is reached.

During the tensioning 232 and the re-tensioning 236, the clamping region 104 initially already provides a first deformation resistance. If the contact surfaces of the tensioning means 110a are subsequently reached, then during the tensioning 232 and the re-tensioning 236, the tensioning means 110a provides a second deformation resistance which is greater than the associated first deformation resistance.

Figure 3:
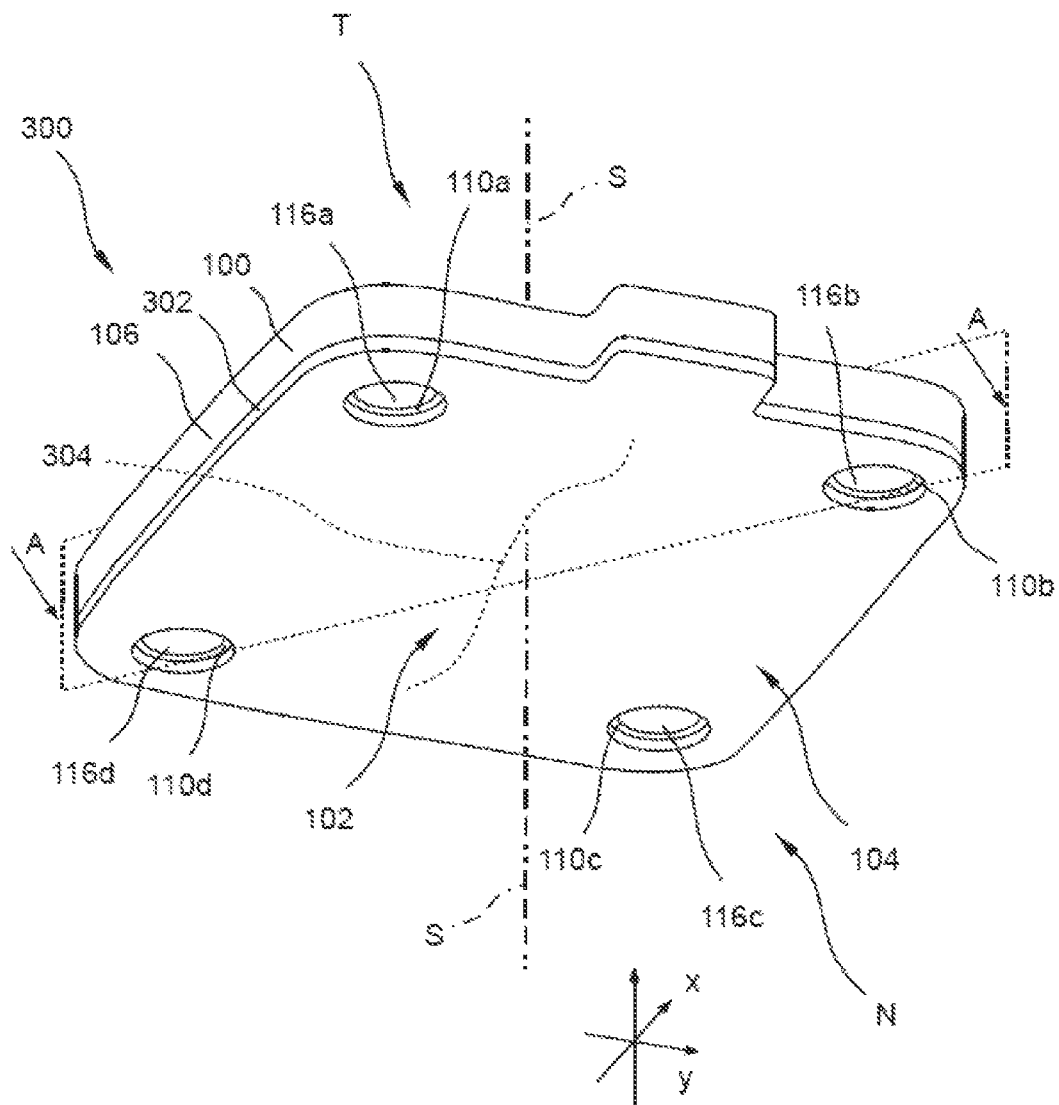

FIG. 3 shows a schematic perspective view of a multi-part diaphragm 300 comprising a wet-side diaphragm 302 and the diaphragm 100 arranged on the dry side according to any of the preceding figures. The two-part diaphragm 300 therefore comprises the first diaphragm 302 facing the valve body of a diaphragm valve and the second diaphragm 100 facing a drive of the diaphragm valve. The two-part diaphragm 300 is clamped in a lateral region—the clamping region 104— between the valve body and the drive. The first diaphragm 302 can also be referred to as a membrane. The first diaphragm 302 comprises, for example, a synthetic fluoropolymer such as polytetrafluoroethylene. The first diaphragm 302 comprises a sealing web 304, wherein the sealing web 130 of the first diaphragm 302 presses onto the valve seat to close off the fluid channel. Of course, the sealing web can also be omitted in other embodiments. In contrast to FIGS. 1 and 2, the tensioning means 110a-d shown are designed as hollow cylinders or sleeves and are arranged within the associated through-openings 116a-d. A central through-opening of the respective tensioning means 110a-d makes it possible for the stay bolts to be guided through the tensioning means.

Figure 4:
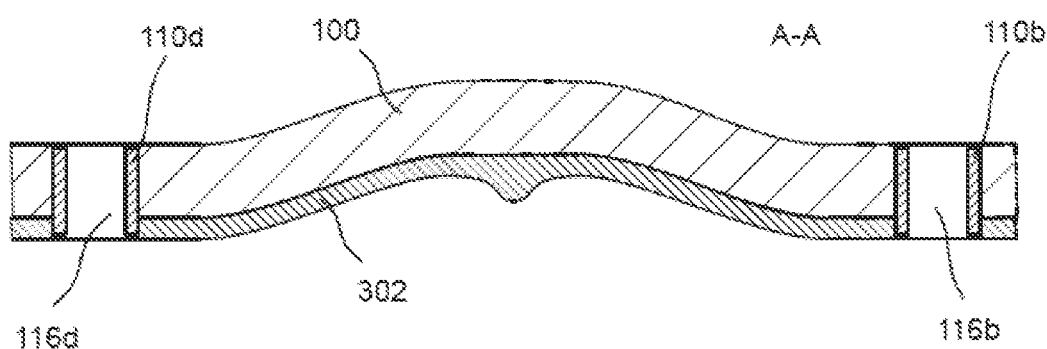
FIGS. 4, 6 and 7 each show a section through the diaphragm according to FIG. 3 or 5.
Figure 5:
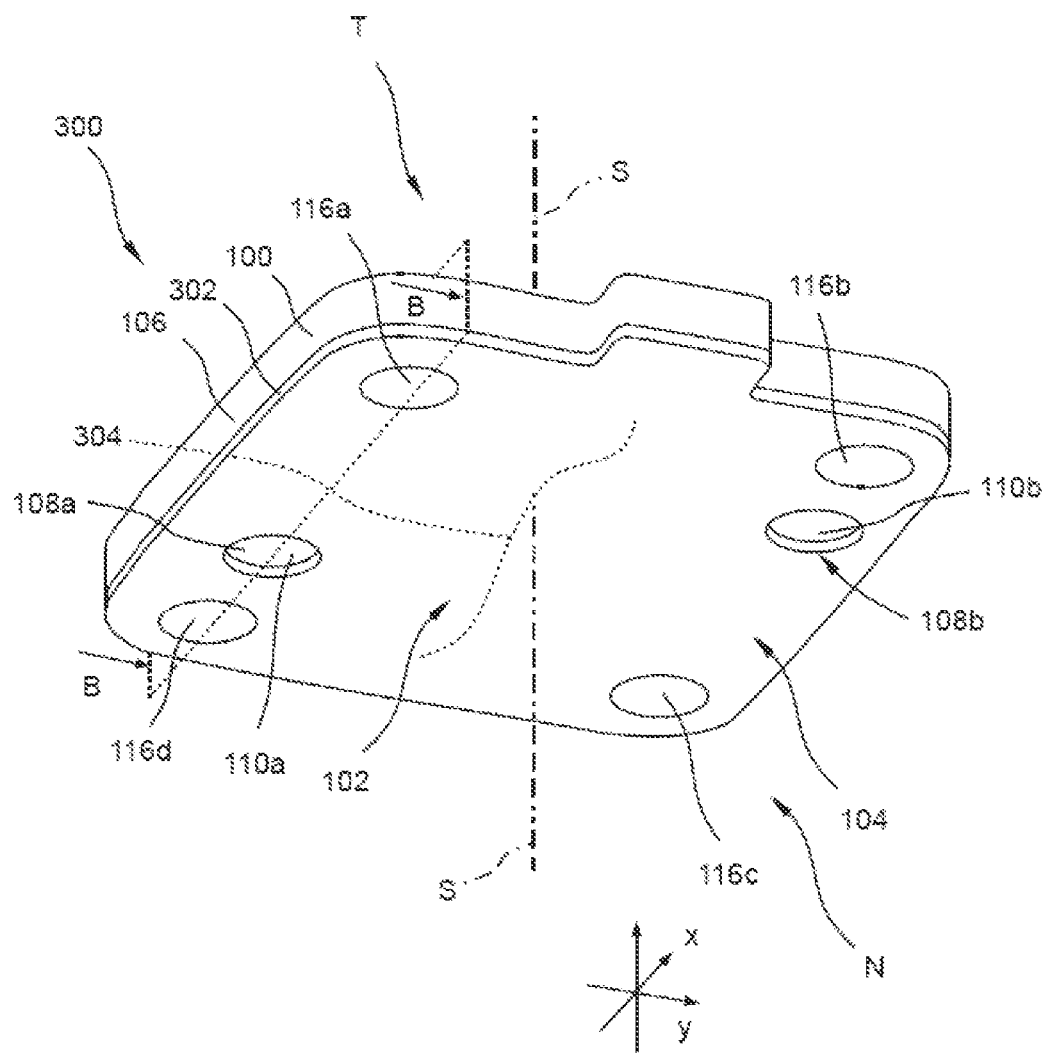

FIG. 4 shows a section A-A of the diaphragm 300 from FIG. 3 in a delivery state, before the assembly between the valve body and the drive body. FIG. 5 shows a perspective view of another example of the two-part diaphragm 300. In contrast to FIG. 3, the tensioning means 110a-b are arranged in recesses 108a-b which are separate from the through-openings 116a-d for the stay bolts.

Figure 6:
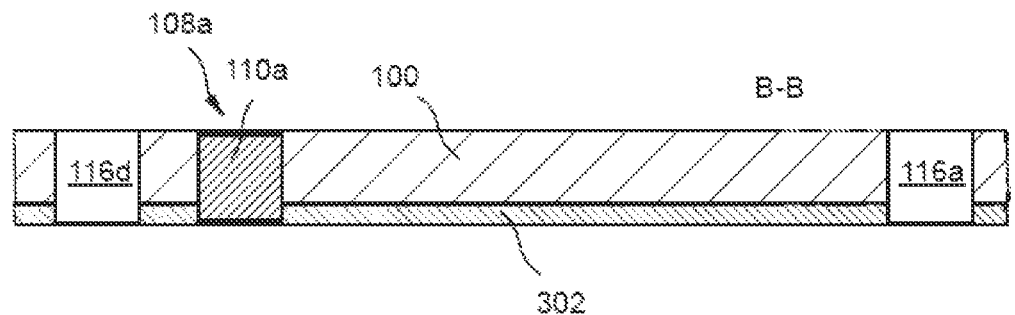

FIG. 6 shows a schematic section B-B from FIG. 5 of the multi-part diaphragm 300 in the delivery state, wherein the recess 108a assigned to the tensioning means 110a leads through the diaphragm 302 arranged on the wet side and the diaphragm 100 arranged on the dry side.

Figure 7:
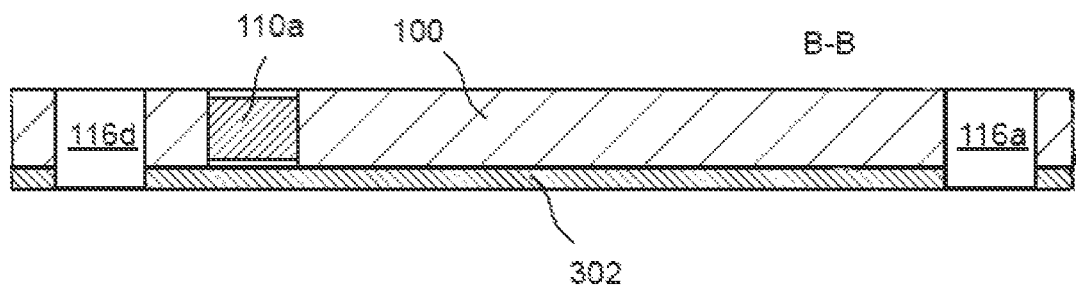

FIG. 7 shows an example of the diaphragm 300 modified with respect to the example of FIGS. 5 and 6, in the schematic section B-B. The recess 108a assigned to the tensioning means 110a leads through the diaphragm 100 arranged on the dry side, wherein a contact surface of the tensioning means 110 can be contacted with a dry side of the wet-side diaphragm 302.

What is claimed is:

1. A multi-part diaphragm for a diaphragm valve, wherein the multi-part diaphragm comprises a wet-side diaphragm arranged on a wet side of the multi-part diaphragm and a dry-side diaphragm arranged on a dry side of the multi-part diaphragm,
   wherein the dry-side diaphragm has a functional region and a clamping region surrounding the functional region, wherein a main body of the dry-side diaphragm provides at least one recess as an opening in the clamping region,
   wherein at least one tensioning means comprises a plastics material and is arranged in the at least one recess, and
   wherein the at least one recess assigned to the at least one tensioning means leads through the wet-side diaphragm arranged on the wet side and the dry-side diaphragm arranged on the dry side, or
   wherein the at least one recess assigned to the at least one tensioning means leads through the dry-side diaphragm arranged on the dry side of the multi-part diaphragm, wherein a contact surface of the at least one tensioning means can be contacted by a dry side of the wet-side diaphragm arranged on the we side of the multi-part diaphragm.

2. The diaphragm according to claim 1, wherein, in a non-tensioned state of the diaphragm, a size of the clamping region perpendicular to an imaginary diaphragm plane is greater than a size of the at least one tensioning means.

3. The diaphragm according to claim 1, wherein the at least one recess is a through-opening, and wherein contact surfaces of the at least one tensioning means are exposed on both sides of the diaphragm.

4. The diaphragm according to claim 1, wherein a material of the at least one tensioning means fills at least 40%, an imaginary cross-section of the at least one recess lying in an imaginary diaphragm plane.

5. The diaphragm according to claim 1, wherein the diaphragm comprises a plurality of recesses each with tensioning means arranged therein, wherein at least two of the plurality of tensioning means are arranged on opposite sides of the functional region of the diaphragm.

6. The diaphragm according to claim 1, wherein the plastics material of the at least one tensioning means has a preferred direction, which extends perpendicular to an imaginary diaphragm plane.

7. The diaphragm according to claim 1, wherein the at least one tensioning means has a modulus of elasticity, which is at least five times greater, than a modulus of elasticity of the main body in the clamping region.

8. The diaphragm according to claim 1, wherein a material of the main body comprises an elastomer, and wherein the plastics material of the at least one tensioning means comprises a thermoplastic material.

9. A diaphragm valve comprising the multi-part diaphragm according to claim 1, wherein the clamping region of the diaphragm is tensioned between a first clamping portion of a valve body and a second clamping portion which is supported on the valve body.

10. A multi-part diaphragm comprising a wet-side diaphragm and comprising the multi-part diaphragm according to claim 1 arranged on the dry side.

11. The multi-part diaphragm according to claim 10, wherein the at least one recess assigned to the at least one tensioning means leads through the diaphragm arranged on the dry side, wherein a contact surface of the at least one tensioning means can be contacted by a dry side of the wet-side diaphragm.

12. A method for assembling a diaphragm of a diaphragm valve, wherein the diaphragm has a functional region and a clamping region surrounding the functional region, wherein a main body of the diaphragm provides at least one recess as an opening in the clamping region and wherein at least one tensioning means comprises a plastics material and is arranged in the at least one recess, the method comprising:
   arranging the diaphragm between a first clamping portion of a valve body and a second clamping portion supported on the valve body;
   tensioning the clamping region of the diaphragm between the first and second clamping portions; and
   re-tensioning the clamping region of the diaphragm between the first and second clamping portions.

13. The method according to claim 12, wherein the clamping region initially provides a first deformation resistance during the tensioning and the re-tensioning, and wherein the at least one tensioning means subsequently provides a second deformation resistance both upon the tensioning and the re-tensioning which is greater than the associated first deformation resistance.

* * * * *